United States Patent [19]

Matsuda et al.

[11] Patent Number: 5,705,806
[45] Date of Patent: Jan. 6, 1998

[54] IMAGE READING APPARATUS

[75] Inventors: Shinya Matsuda, Machida; Koichi Kamon, Toyokawa, both of Japan

[73] Assignee: Minolta Co., Ltd., Osaka, Japan

[21] Appl. No.: 827,777

[22] Filed: Apr. 11, 1997

Related U.S. Application Data

[63] Continuation of Ser. No. 402,627, Mar. 13, 1995, abandoned.

[30] Foreign Application Priority Data

| Mar. 14, 1994 | [JP] | Japan | 6-042684 |
| Jul. 10, 1996 | [JP] | Japan | 8-180521 |
| Jul. 10, 1996 | [JP] | Japan | 8-180522 |

[51] Int. Cl.$^6$ .................................................. H01J 40/14
[52] U.S. Cl. ...................... 250/208.1; 250/226; 358/512; 348/270
[58] Field of Search ..................... 250/208.1, 226, 250/556, 237 G, 330, 271; 358/512–518, 522; 348/269–271, 272, 273

[56] References Cited

U.S. PATENT DOCUMENTS

| 4,891,691 | 1/1990 | Baba | 358/512 |
| 5,010,414 | 4/1991 | Clapp | 358/512 |
| 5,084,611 | 1/1992 | Okisu et al. | 250/208.1 |
| 5,101,266 | 3/1992 | Schlig et al. | 348/271 |
| 5,134,439 | 7/1992 | Zuber | 355/214 |
| 5,355,234 | 10/1994 | Kim | 358/512 |

FOREIGN PATENT DOCUMENTS

2066610 7/1981 Germany.

*Primary Examiner*—Que Le
*Attorney, Agent, or Firm*—Price, Gess & Ubell

[57] ABSTRACT

An image reading apparatus for reading documents disposed face upward on a document platen by optical scanning. The image reading apparatus comprises a color correction filter which has characteristics for shielding light of visible light range and is inserted into said imaging system on prescanning to detect the height of the document.

25 Claims, 7 Drawing Sheets

IMAGE READING APPARATUS

This is a continuation of application Ser. No. 08/402,627, filed on Mar. 13, 1995, now abandoned.

BACKGROUND OF THE INVENTION

1. Field Of The Invention

The present invention relates to an image reading apparatus for reading book-like documents, and more specifically relates to an image reading apparatus capable of changing spectral characteristics of the imaging system in accordance with document type and reading conditions.

2. Description Of The Related Art

Among conventional image reading apparatus for reading spatially curved documents such as books and the like are camera type apparatus providing an arrangement of area sensors in a silver salt photographic film region. Such apparatus provide that the focus of the lens is in a main portion of a single area of the object. Image reading apparatus having line sensors capable of moving while scanning as well as image reading apparatus capable of correcting image distortion, measuring height, and aligning focal points are known. The latter apparatus measures height of the documents by scanning the interior edge portion thereof via the use of mirrors.

Image reading apparatus which accomplish image processing of an imaged document are known to accomplish optimum image processing by changing density reproduction characteristics (the so-called gamma curve) of the imaging system or changing the spatial frequency characteristics (the so-called modulation transfer function (MTF) characteristics) expressing details of periodic structures comprising an image when binary images such as text characters are read and when halftone images such as photographs are read.

Methods for specifying a document size detection region and editing region are known wherein an editing panel on a document platen is processed in yellow color and a color correction filter which does not transmit yellow color is inserted into the imaging system during a preparatory scan, such that the amount of light reflected from the editing panel is reduced, and the difference between the amount of light reflected from said editing panel and the amount of light reflected from a white color document is used to detect document size.

In image reading apparatus of a camera type wherein documents are read from above, it is generally undesirable, from the perspective of improving operational characteristics, to accomplish imaging in a darkroom, or use a cover device to cover the document and entire apparatus. Furthermore, it is necessary that the amount of light used to expose the document be controlled so as to not blind an operator who may view the document surface as it is being imaged.

In attempting to realize an image reading apparatus which satisfies the previously described conditions, various disadvantages arise which cause reductions in image quality due to reduced illumination and environmental influences within the room where the apparatus is installed.

That is, when accomplishing low illumination imaging, the amount of light reaching the imaging sensor used for imaging is reduced, such that the ratio of the optical signal output and the noise component of the imaging system (the so-called signal-to-noise (S/N) ratio) is effectively reduced, thereby reducing image sharpness. This image sharpness is not a requirement when a binary image comprising mainly text characters is imaged, but a reduction of the S/N ratio becomes a major problem when imaging halftone documents such as photographs due to reduced image quality. Furthermore, interior fluorescent lighting and the like is common in rooms where image reading apparatus are installed, and since such illumination devices flicker at commercial frequencies (50 Hz or 60 Hz in Japan), problems arise with image irregularities due to changes in the interior illumination when reading documents without using the previously mentioned cover. This so-called exterior lighting irregularity is a greater disadvantage in photographic documents than textual documents, as previously described.

In the Japanese domestic market, the custom is to represent personal seal impressions and important sections in red. Even in overseas markets, important notes are written in red, and red underlining is used for important entries in text documents. Although there is a demand for apparatus which accurately reproduce images without loss of such red color image data, conventional apparatus are not necessarily adequate in this regard. The demand for accurate red color reproduction is quite strong relative to text documents, but not important relative to photographic documents.

In imaging thick document such a books from above, it is necessary beforehand to handle data for determining imaging conditions such as the height of the document. Thus, the arrangement at the interior of the document platen of mirrors for imaging the interior edge of a document was considered, but in this method, reflected light from light sources such as interior lighting, and accessories worn by an operator are reflected by said mirror, such that there is the possibility of erroneous operation.

SUMMARY OF THE INVENTION

A main object of the present invention is to provide an image reading apparatus capable of inhibiting the influence of interior lighting where the apparatus is installed so as to reduce so-called exterior lighting irregularity, and which is capable of imaging under low illumination conditions which do not blind an operator even when reading halftone images such as photographs by selectively changing suitable color correction means.

A further object of the invention is to provide an image reading apparatus capable of accurately reproducing data expressed in red color such as seal impressions and the like when reading a binary text image by shielding the red color light greater than a predetermined wavelength, and which is capable of accurately estimating the height of a document such as a book by eliminating the influence of interior lighting when making a preparatory scan.

These objects of the present invention are achieved by providing an image forming apparatus for reading documents disposed face upward on a document platen by optical scanning, said image reading apparatus comprising imaging element for reading a document, imaging lens for forming an optical image of a document on said imaging element and color correction means for changing the spectral characteristics of the imaging system. The changing of spectral characteristics of the imaging system is accomplished by changing said color correction means for a prescan for collecting data to set imaging conditions, and a main scan for reading a document image.

These objects of the present invention are further achieved by providing an image forming apparatus wherein the spectral characteristics of the imaging system are changed by changing said color correction means when reading binary images of text documents, and when reading halftone images of photographs.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

Figure 1:
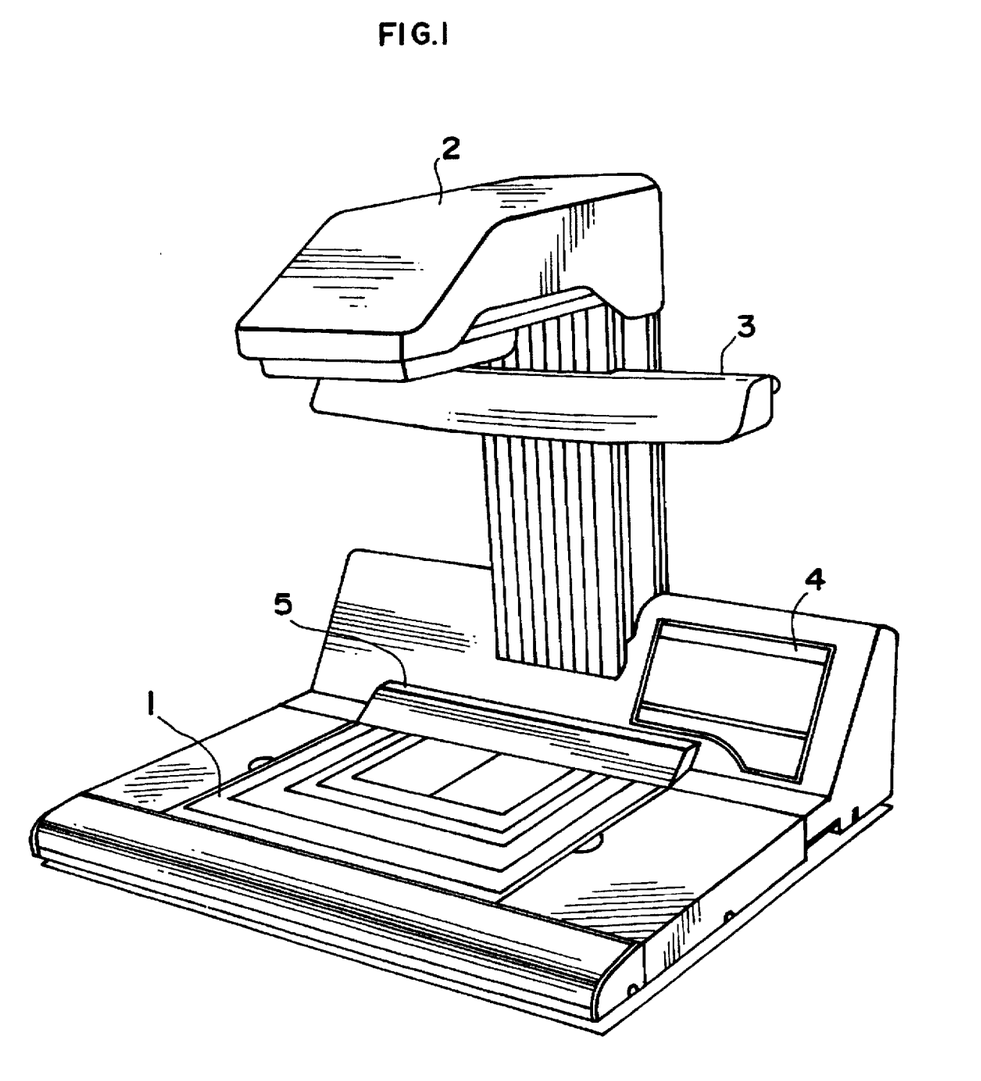
FIG. 1 is a perspective view showing the general construction of an embodiment of the image reading apparatus of the present invention.

FIG. 1 shows the general construction of an embodiment of the image reading apparatus of the present invention.

As shown in the drawing, a document such as a book, file or the like is disposed facing upward on document platen 1 of the present embodiment of the image reading apparatus (hereinafter referred to as the "apparatus"), and imaging camera 2 is provided thereabove to read said document via scanning by sensors described later.

Illumination section 3 for illuminating a document is provided above and on the interior side of document platen 1, operation section 4 is provided for setting image reading conditions (including selection of text image and photographic image) and the like, and rangefinder mirror 5 for imaging the edge configuration of a document is provided on the interior side of document platen 1. Illumination section 3 not only illuminates at wavelengths within the visible light range, but also illuminates at wavelengths above 700 nm.

Figure 2:
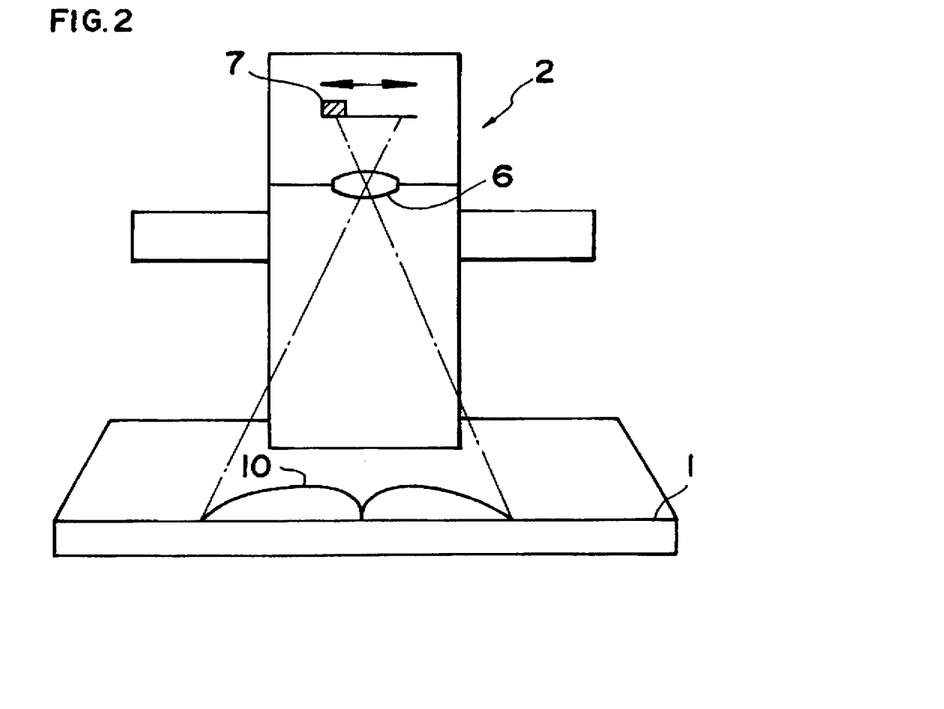
FIG. 2 briefly shows the construction of the apparatus from a frontal view.

FIG. 2 briefly shows the construction of the apparatus from a frontal view. The aforesaid imaging camera 2 is provided with an imaging lens 6 for forming the document image on an imaging element described later, and a charge-coupled device (CCD) line sensor 7 used as an imaging element for scanning the focal plane in which the document image is formed in a subscan direction (arrow direction in FIG. 2). Document 10 placed on document platen 1 may be, for example, a book or a file bound on one edge, which opens from side to side, and wherein the pages have a cylindrical surface configuration which curve spatially.

Figure 3:
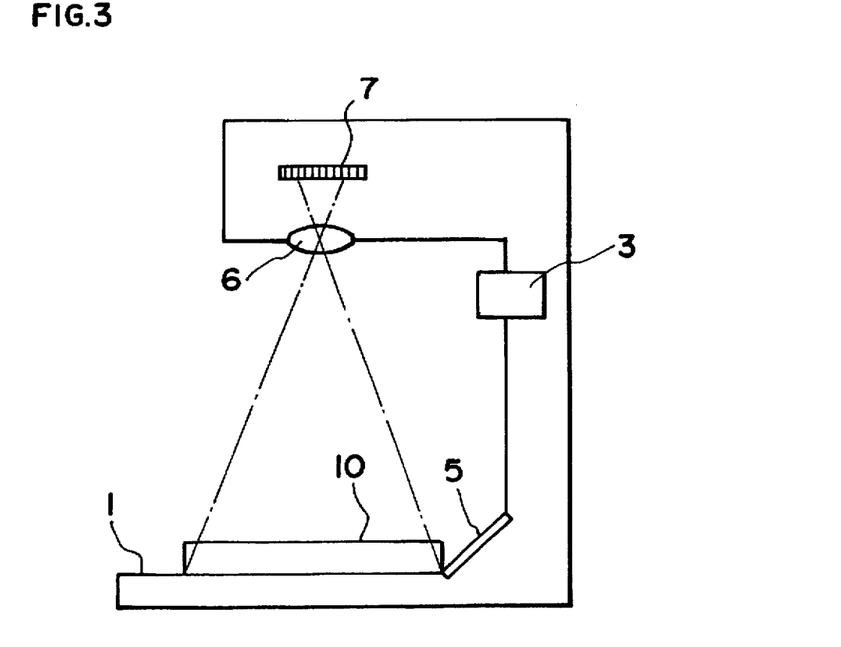
FIG. 3 briefly shows the construction of the apparatus from a side view.

FIG. 3 briefly shows the construction of the apparatus from a side view. The image of the edge configuration of a document reflected in rangefinder mirror 5 is read by a portion of CCD line sensor 7. Rangefinder mirror 5 extends laterally at the interior side of document platen 1 when viewed from the front, and is inclined at a 45° angle relative to the surface of platen 1, and further functions as a document positioning member. Alignment of rangefinder mirror 5 with document 10 is accomplished by abutting the interior edge of document 10 against the bottom edge of rangefinder mirror 5.

Figure 4:
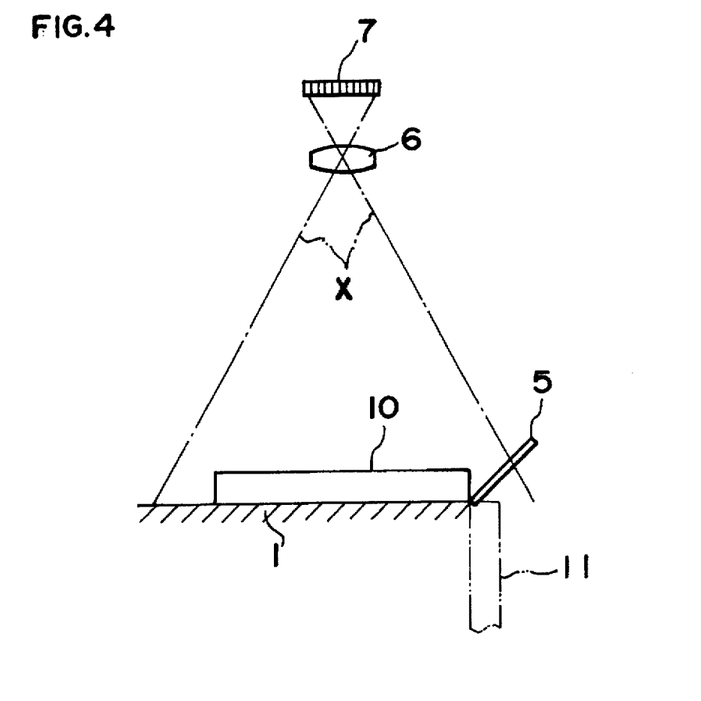
FIG. 4 is an illustration of the rangefinder principle of the apparatus.

FIG. 4 is an illustration of the rangefinder principle of the apparatus. When document 10 is placed at a predetermined position, a mirror image 11 of document 10 is formed by rangefinder mirror 5, as shown in the drawing. Accordingly, mirror image 11, which describes the edge surface configuration of the document, extends along the length of the image of document platen 1 so as to be formed continuously with the document image. Dashed line X in the drawing represents the reading range of CCD line sensor 7.

In the prescan executed prior to the main scan for imaging document 10, the distribution of height data of document 10 can be measured in a lateral direction when viewed from the front (interior direction in FIG. 4) by reading the mirror image 11 representing the edge surface configuration of the document reflected in rangefinder mirror 5 by means of CCD line sensor 7.

Figure 5:
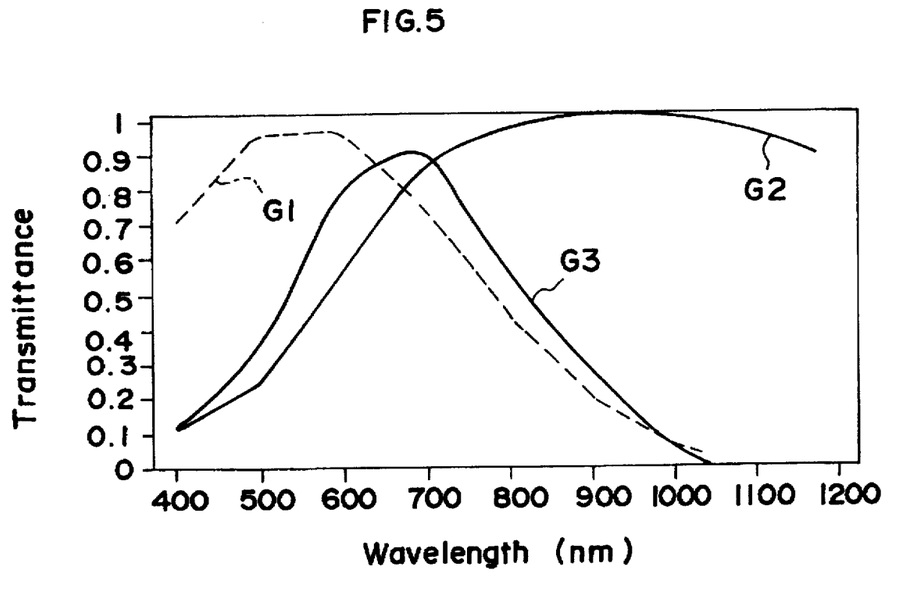
FIG. 5 is an illustration showing the spectral characteristics of the imaging system of the apparatus.

FIG. 5 shows the spectral characteristics of the imaging system of the present apparatus. The imaging system is specifies as all components relating directly to image reading. In the drawing, reference number G1 refers to spectral sensitivity characteristics of CCD line sensor 7, and reference number G2 refers to spectral distribution of the illumination lamp of illumination section 3. Although a halogen bulb is used as the illumination lamp in the present apparatus, the invention is not limited to such an arrangement. Reference number G3 refers to spectral characteristics of the entire imaging system combining G1 and G2. As can be clearly understood from the drawing, spectral characteristics of the present apparatus have a broad range of red color peak from the visible light range to the near infrared range.

Figure 6:
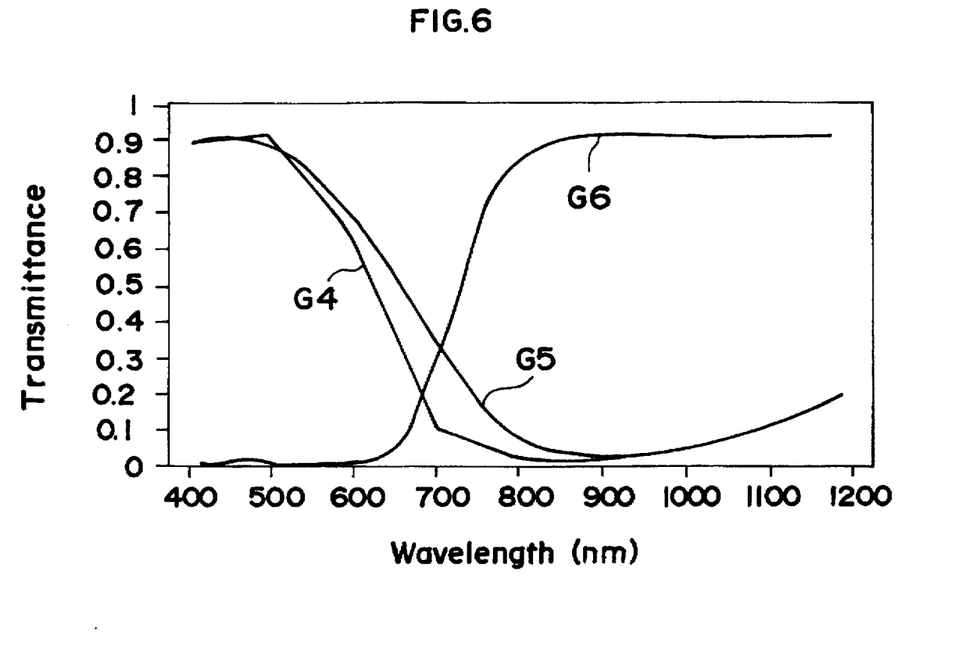
FIG. 6 is an illustration showing the spectral transmittance of color correction filters provided in the present apparatus.

The present apparatus is provided with color correction filters 12 (12a, 12b, 12c; refer to FIG. 8) as a color correction means. FIG. 6 shows the spectral transmittance of color correction filters 12. In the drawing, reference number G4 refers to spectral transmittance of color correction filter 12a used in text imaging mode; reference number G5 refers to spectral transmittance of color correction filter 12b used in photographic imaging mode; and reference number G6 refers to spectral transmittance of color correction filter 12c used in prescan mode.

Figure 7:
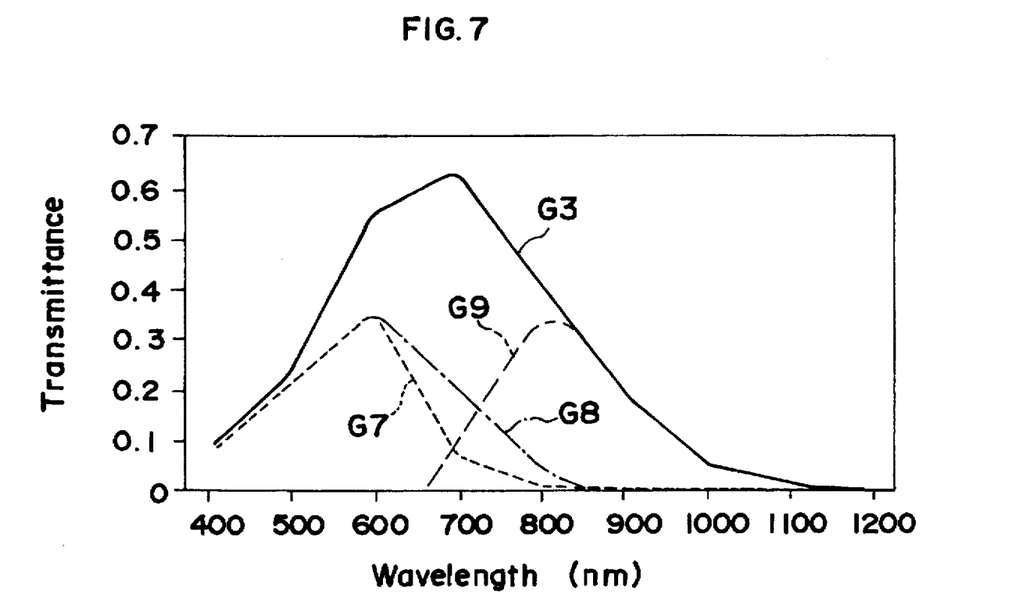
FIG. 7 is an illustration showing the spectral characteristics of the imaging system of the apparatus when using a color correction filter.

FIG. 7 shows the spectral characteristics of the imaging system of the apparatus when using the respective color correction filters 12. In the drawing, reference number G7 refers to spectral characteristics of the imaging system when color correction filter 12a is used in the text imaging mode; reference number G8 refers to spectral characteristics of the imaging system when color correction filter 12b is used in the photographic imaging mode; and reference number G9 refers to spectral characteristics of the imaging system when color correction filter 12c is used in the prescan mode. Reference number G3 further refers to spectral characteristics of the imaging system when the aforesaid filters 12 are not used.

Color correction filter 12a has characteristics for shielding red color light above a wavelength of 600 nm. Accordingly, in text imaging mode, dense reproduction is possible without loss of data expressing the red color of seal impressions and the like by inserting said filter 12a in the imaging system.

Color correction filter 12b has characteristics for gradually shielding light above a wavelength of 550 nm. Accordingly, in photographic imaging mode, color reproduction akin to human visual acuity is possible by inserting said filter 12b in the imaging system.

On the other hand, the optical signal output of CCD line sensor 7 is a value proportional to the surface area of the bottom of the graph of spectral characteristics shown in FIG. 7 because the amount of light attaining said sensor is proportional. As can be clearly understood from FIG. 7, signal output in the photographic imaging mode can be greater than in the text imaging mode, thereby improving the S/N ratio, and obtaining smooth halftone reproduction.

When even greater sharpness is required, a filter having transmittance in the near infrared range as a method to improve the S/N ratio. This method is advantageous inasmuch as the sensitivity of the imaging system is greater for the infrared component relative to the visual light component, such that the adverse affects of interior lighting such as fluorescent lights is inhibited. This means density irregularities resulting from fluctuation of frequency of the interior lighting are reduced, thereby effectively producing even greater image sharpness.

Color correction filter 12c has characteristics for shielding light of visible light range. In summary, it has characteristics for shielding light having a wavelength of 700 nm or less. Accordingly, in prescan imaging mode, the influence of reflected light from interior lighting such as fluorescent lights and accessories worn by an operator can be eliminated, by inserting said filter 12c in the imaging system. Furthermore, it is possible that the height of a document such as a book and the like can be accurately measured by means of the light emitted by illumination section 3.

Figure 8:
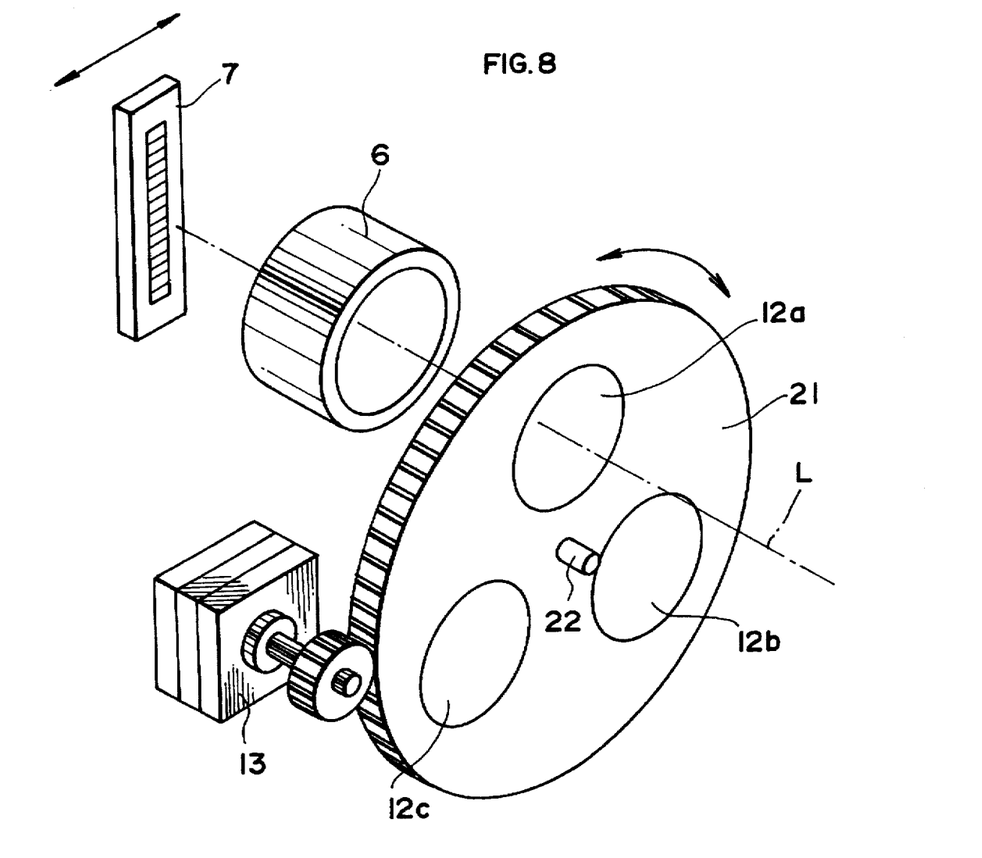
FIG. 8 is a perspective view showing the mechanism for switchably inserting a color correction filter into the imaging system.

FIG. 8 shows the mechanism for switchably inserting a color correction filters 12a, 12b, 12c into the imaging system. These filters 12a, 12b, and 12c are mounted on disk-shaped holder 21 at equally spaced intervals in the circumferential direction as shown in the drawing, are supported on shaft 22 so as to be rotatable, and are arranged so as to be separated from the document front side of imaging lens 6 by a predetermined distance. For example, the state shown in FIG. 8 shows text imaging mode, wherein light from a document passes through color correction filter 12a, and forms an image via imaging lens 6 on CCD line sensor 7 which scans in the arrow direction in the drawing.

Holder 21 has gear teeth formed on its exterior circumferential surface, and is rotatably driven in the arrow direction by filter changing motor 13 provided with a drive shaft having a small gear wheel which engages the aforesaid gear. Thus, color correction filters 12a, 12b, 12c can be suitably inserted within the imaging optical path. In FIG. 8, optical path L from the document to CCD line sensor 7 is different in FIGS. 1–4, and has been rendered in a horizontal direction to facilitate understanding of the drawings.

Figure 9:
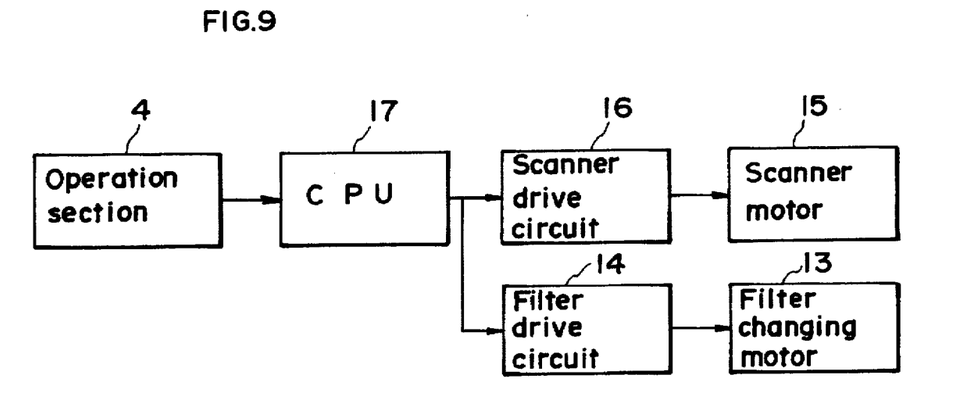
FIG. 9 is a block diagram of the control block of the apparatus.

FIG. 9 is a block diagram showing the control block of the present apparatus.

Figure 11:
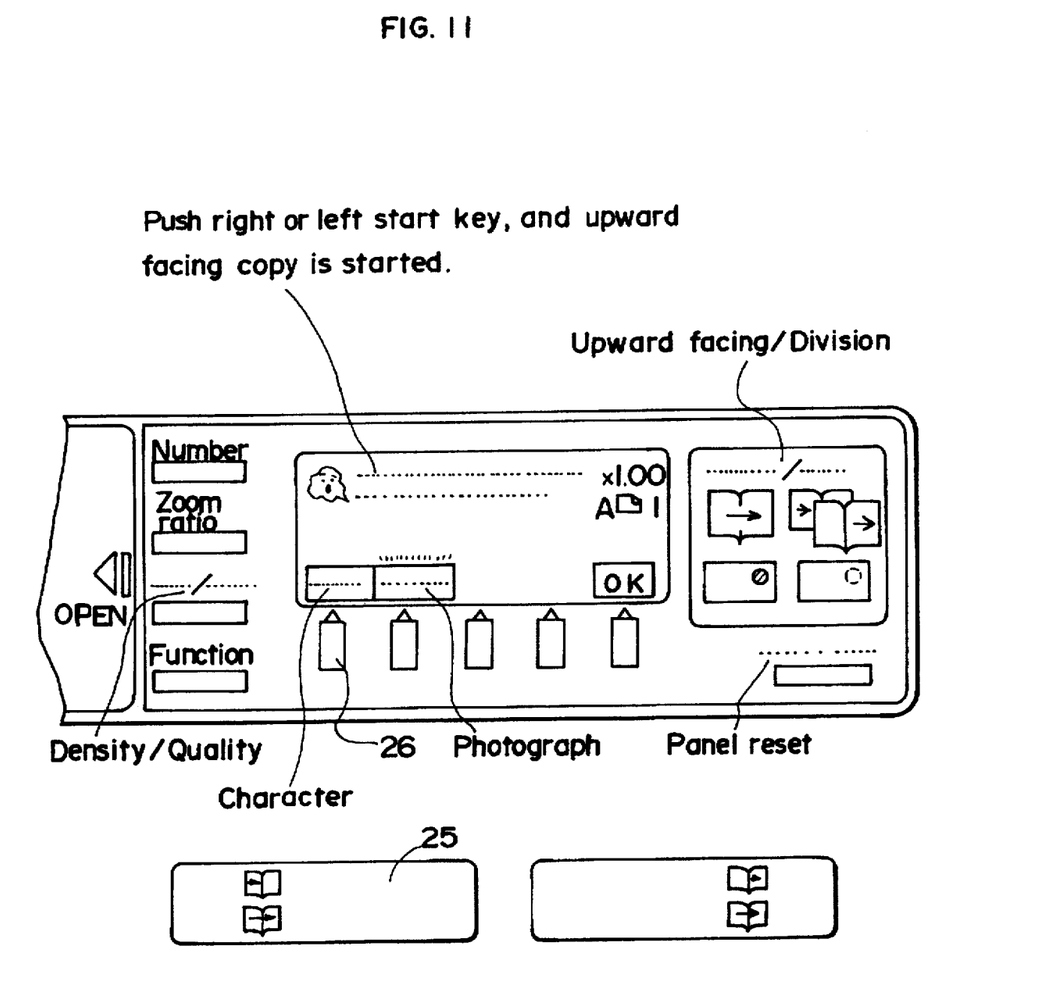
FIG. 11 is an illustration showing the operation portion of the present apparatus.

Central processing unit (CPU) 17 is used as a control means for general control of the entire apparatus. CPU 17 controls the actuation of scanner motor 15 for moving CCD line sensor 7 during scanning via scanner drive circuit 16, and filter changing motor 13 via filter drive circuit 14. Operation section 4 is connected to CPU 17, said operation section 4 being provided with start key 25 for starting the reading operation, and mode changing key 26 for selecting the text image mode and the photographic mode, as shown in FIG. 11.

Figure 10:
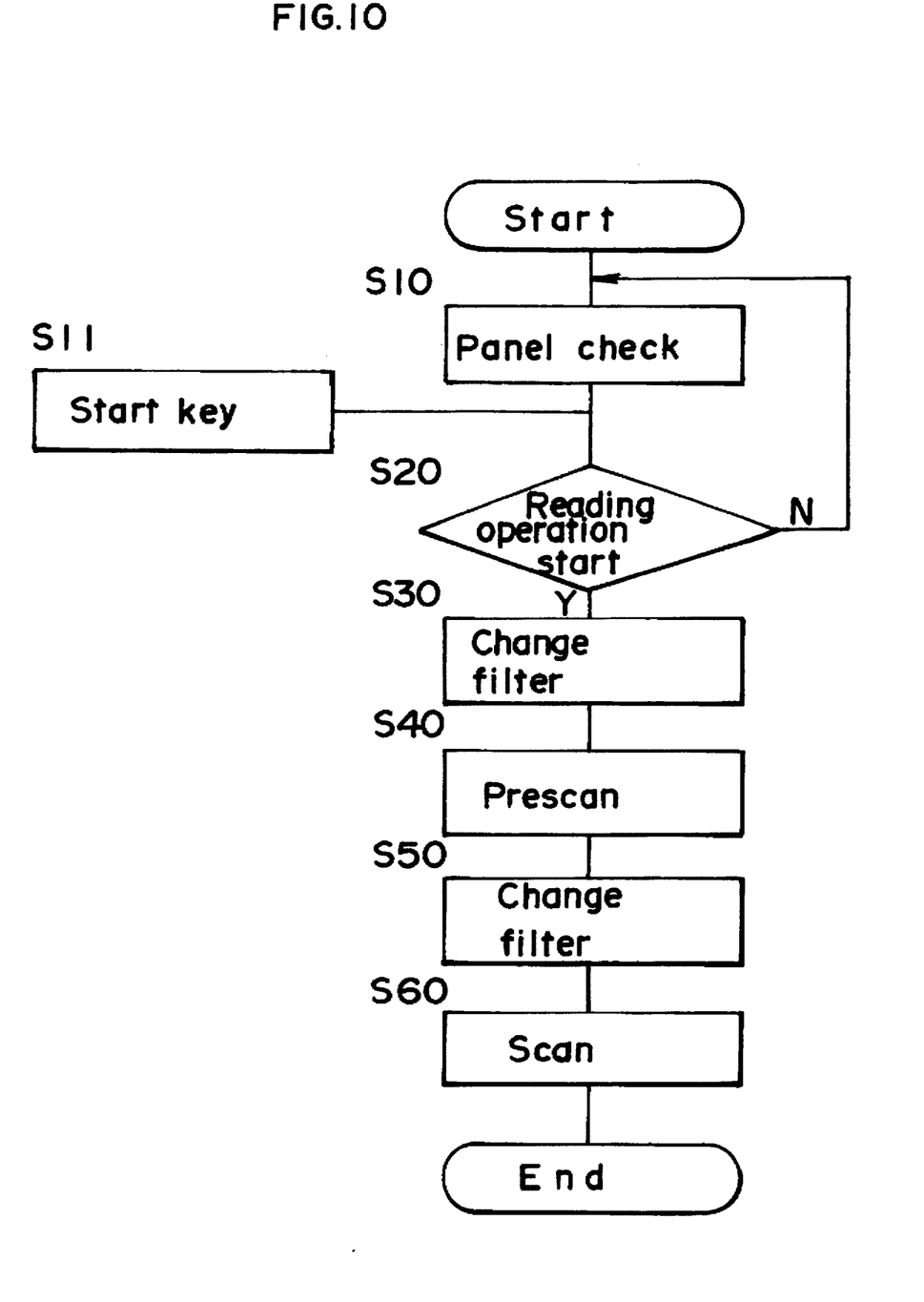
FIG. 10 is a flow chart showing the control of the reading operation of the present apparatus.

The reading operation of the apparatus is described hereinafter with reference to the control sequence shown in FIG. 10.

When the apparatus system is started, a check is made of the operation panel in step S10. In step 10, imaging modes, number of copies, magnification, density and like information preset by operation section 4 are checked.

In step S20, a check is made to determine whether or not start key 25 is switched ON (step S11) and a reading operation start signal has been received. Accordingly, when start key 25 has not been turned ON, the routine returns to step S10, the panel check is executed, and set data are changed or their contents are updated.

On the other hand, when start key 25 is ON in step S11 and a reading operation start signal is input to CPU 17, the routine advances to step S30. CPU 17 executes instructions for changing prescan mode color correction filter 12c to filter drive circuit 14. Thus, filter changing motor 13 is actuated to drivably rotate filter holder 21 so as to change to predetermined color correction filter 12c.

When the filter change is completed, CPU 17 executes instructions to start the prescan via scanner drive circuit 16. Thus, scanner motor 15 is actuated to move CCD line sensor 7, and prescanning is accomplished (step S40). This prescan produces document height data which are used to align the focal point and correct image distortion.

When the prescan is completed, and at the moment a reading operation start signal is received, CPU 17 executes instructions to change to the color correction filter suitable for the present scan based on imaging mode information displayed on operation section 4. A predetermined color correction filter is changed in the same manner as previously described (step S50).

Finally, CPU 17 executes instructions to start the scan via scanner drive circuit 16, and the document reading operation is completed (step S60).

The present apparatus is provided with color correction filters 12a, 12b, and 12c so that the spectral characteristics of the imaging system can be changed in accordance with the type of document and imaging conditions. If, for example, color correction filter 12a is selected, reproduced density can be increased without loss of information represented in red color such as a seal impression and the like in the text imaging mode by shielding the red color light above a wavelength of 600 nm.

If color correction filter 12b is selected, greater signal output can be obtained in the photographic imaging mode than in the text imaging mode by gradually shielding light having a wavelength over 550 nm, and smooth halftone reproduction can be obtained even at low illumination due to the improved S/N ratio. If transmittance in the near infrared range of the filter is increased to improve the S/N ratio, density irregularities generated by fluctuation in the frequency of room lighting can be reduced so as to achieve even sharper images.

If color correction filter 12c is selected, the adverse affects of reflected light such as that of room light or accessories worn by an operator can be eliminated during prescanning by shielding light having a wavelength of 700 nm or less. therefore, it is possible to accurately measure the height of a document such as a book.

Although a means for changing color correction filter 12 was provided at the front of imaging lens 6 as a method for changing the spectral characteristics in the present embodiment, it is to be noted that the present invention is not limited such an arrangement. For example, it is possible to use methods wherein a color correction filter is provided at the front of illumination section 3 which illuminates the document so as to change the spectral characteristics for illumination light, and methods wherein a color correction filter is provided at the front of CCD line sensor 7 which reads the document so as to change the spectral characteristics of the sensor.

In the present embodiment, the spectral characteristics were changed from a wavelength of 600 nm to 700 nm. It is to be noted, however, that suitable changes in spectral characteristics can be made in accordance with required specifications, and essential components such as imaging elements, illumination lamp and the like. For example, when reproducing dense red colors, it is necessary to reduce the changed wavelength in the text imaging mode. If the wavelength range of the fluorescent lighting where the apparatus is installed is a long wavelength, the changed wavelength must be increased for prescan.

Although the changing of the text and photographic imaging modes has been described in terms of manual input via the operation section 4, it is to be understood that a prescan may be performed prior to changing the color separation filter to determine whether or not the document is a text document or a photographic document. In such circumstances, said determination may be made by, for example, generating a histogram of the optical signals.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus for reading documents disposed fare upward on a document platen by optical scanning, said image reading apparatus comprising:
   an imaging system which includes an imaging sensor and an imaging lens for forming an optical image of the document on said imaging sensor;
   a color correction filter which has characteristics for shielding light of visible light range including red, green, and blue color; and
   a driver which selectively inserts said color correction filter into said imaging systems.

2. An image reading apparatus as claimed in claim 1, wherein said color correction filter has characteristics for shielding light having a wavelength of 700 nm or less.

3. An image reading apparatus as claimed in claim 1, further comprising a controller which executes prescanning operation prior to main scanning operation and actuates said driver to insert the filter into the imaging system in said prescanning operation.

4. An image reading apparatus for reading documents by optical scanning, said image reading apparatus comprising:
   an imaging system which includes a line sensor and an imaging lens for forming an optical image of the document on said line sensor;
   a color correction filter which has characteristics for shielding light of a predetermined wavelength;
   a mode selecting means for selecting one from a plurality of imaging modes, each of said modes being provided based on the type of the document; and
   a driver which selectively inserts said color correction filter into said imaging system based on the result of the mode selection.

5. An image reading apparatus as claimed in claim 4, wherein said color correction filter shields red color light above a wavelength of 600 nm.

6. An image reading apparatus as claimed in claim 4, wherein said selecting means includes a key for selecting one from a plurality of imaging modes.

7. An image reading apparatus as claimed in claim 5, further comprising
   the mode selecting means selects a text image mode and a photographic mode; and
   a controller which actuates said driver when said text image mode is selected.

8. An image reading apparatus as claimed in claim 5, further comprising a second color correction filter which has characteristics for gradually shielding light above a wavelength of 550 nm, said second color correction filter is inserted in the photographic mode.

9. An image reading apparatus comprising:
   an imaging element for reading a document;
   an imaging lens for forming an optical image of the document on said imaging element;
   color correction means for changing the spectral characteristics of the optical image, said color correction means including a first filter having characteristics for shielding light of a predetermined wavelength and a second filter having characteristics for shielding light of wavelength different from that of said first filter; and
   a control means for controlling said color correction means based on the type of the document.

10. An image reading method for reading documents disposed face upward on a document platen by optical scanning, said method comprising;
    a first step of scanning a document with a first filter for produce document height data which are used to align the focal point and correct image distortion;
    a second step of changing the first filter into a second filter, said second filter having a characteristics different from that of the first filter; and
    a third step of scanning a document with the second filter for produce document image.

11. An image reading method as claimed in claim 10, wherein said second filter is selected from a plurality of filters based on imaging mode.

12. An image reading method as claimed in claim 10, wherein said first filter has characteristics for shielding light of visible light range.

13. An image reading method as claimed in claim 10, wherein said second filter has characteristics for gradually shielding light above a wavelength of 550 nm.

14. An image reading method as claimed in claim 10, wherein said second filter has characteristics for gradually shielding light above a wavelength of 550 nm.

15. An image reading method as claimed in claim 10, wherein said first filter has characteristics for shielding light having a wavelength of 700 nm or less.

16. An image reading apparatus for reading documents comprising;
an imaging system which reads images from a document via scanning by a sensor during a main scanning operation;
a first color correction filter which has characteristics for shielding light of visible light range including red color, green color, and blue color;
a start key for starting a reading operation; and
a controller for executing a prescanning operation with said first color correction filter prior to the main scanning operation in a response to signal from the start key to measure the height of a document.

17. An image reading apparatus as claimed in claim 16, further comprising a second correction filter which has characteristics for shielding light above a wavelength of 600 nm, wherein said controller executes the main scanning operation with said second correction filter.

18. The image reading apparatus of claim 16 further including a second color correction filter for gradually shielding light above a wavelength of 550 mm, whereby the controller can insert the second color correction filter into the imaging system for the entire main scanning operation.

19. The image reading apparatus of claim 18 further including a third color correction filter for shielding light above a wavelength of 600 mm, whereby the controller can insert the third color correction filter into the imaging system for the entire main scanning operation.

20. An image reading apparatus for prescanning documents to determine height data of a document to determine imaging conditions and subsequently for reading images from the document during a main scanning operation comprising:
support means for supporting a document to be read;
a sensor member;
an imaging system for realizing an image of the document in the sensor member;
a color correction filter assembly including a first filter for shielding light in the red, green, and blue color range of a visible light spectrum to enhance measurement of height data, a second filter for transmitting light in the visible light spectrum to enhance a photographic image and a third filter for transmitting light in visible light spectrum to enhance a printed text image, the filter assembly is positioned between the support means and the sensor member for selectively inserting a filter into the imaging system; and
control means for selectively inserting the first filter into the imaging system during a prescan mode of operation for a measurement of height data and subsequently removing the first filter and inserting one of the second filter and the third filter during a main scanning mode of operation.

21. The image reading apparatus of claim 20 wherein the first filter shields light having a wavelength of 700 mm or less.

22. The image reading apparatus of claim 21 wherein the second filter gradually shields light above a wavelength of 550 mm.

23. The image reading apparatus of claim 22 wherein the third filter shields light above a wavelength of 600 mm.

24. An image reading apparatus for prescanning documents to determine height data and for reading images from documents during a main scanning operation comprising:
support means for supporting a document to be read;
a sensor member;
an imaging system for realizing an image of the document in the sensor member;
a color correction filter assembly including a first filter for shielding light in the red, green, and blue color range of a visible light spectrum to enhance measurement of height data and at least a second filter for transmitting light in the visible light spectrum, the filter assembly positioned is between the support means and the sensor member for selectively inserting a filter into the imaging system; and
control means for selectively inserting the first filter into the imaging system during a prescan mode of operation for a measurement of height data and subsequently removing the first filter and inserting the second filter during a main scanning mode of operation.

25. The image reading apparatus of claim 24 further including a third filter, the second filter is used for imaging in a photographic imaging mode of operation during a main scanning operation while the second filter is used for imaging in a document imaging mode of operation during a main scanning operating.

* * * * *